United States Patent
Hochhalter et al.

(10) Patent No.: US 6,756,707 B2
(45) Date of Patent: Jun. 29, 2004

(54) ELECTRIC ACTUATOR

(75) Inventors: Keith Hochhalter, Minnetrista, MN (US); Eugene F. Case, Andover, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 34 days.

(21) Appl. No.: 10/057,833

(22) Filed: Jan. 24, 2002

(65) Prior Publication Data

US 2002/0109427 A1 Aug. 15, 2002

Related U.S. Application Data

(60) Provisional application No. 60/264,330, filed on Jan. 26, 2001.

(51) Int. Cl.[7] .................................................. H02K 7/06
(52) U.S. Cl. ........................................ 310/20; 74/89.23
(58) Field of Search ............................ 74/89.23, 89.25, 74/89.33, 89.26; 310/20, 80; 219/86.25, 86.31, 86.41, 86.32

(56) References Cited

U.S. PATENT DOCUMENTS

| | | | |
|---|---|---|---|
| 3,815,435 A | 6/1974 | Eschenbacher et al. .. | 74/424.87 |
| 3,851,541 A | 12/1974 | Ploss et al. ................. | 74/89.42 |
| 3,969,807 A * | 7/1976 | Takizawa et al. ........... | 29/564.6 |
| 4,072,063 A * | 2/1978 | Nauman ....................... | 74/405 |
| 4,198,872 A | 4/1980 | Metz .......................... | 74/89.42 |
| 4,250,762 A | 2/1981 | Weatherby .................. | 74/89.38 |
| 4,266,437 A | 5/1981 | Obergfell .................... | 74/89.37 |
| 4,286,793 A | 9/1981 | Ploss et al. .................. | 277/354 |
| 4,369,011 A | 1/1983 | Ploss ........................... | 411/223 |
| 4,393,319 A | 7/1983 | Bock ............................ | 310/80 |
| 4,438,662 A * | 3/1984 | Walton et al. ................ | 74/625 |
| 4,489,248 A | 12/1984 | Petersen ....................... | 310/76 |
| 4,496,865 A | 1/1985 | Allen et al. ................... | 310/80 |
| 4,643,710 A * | 2/1987 | Troutner ....................... | 494/60 |
| 4,664,136 A * | 5/1987 | Everett ......................... | 137/85 |
| 4,860,638 A | 8/1989 | Hosono et al. ................ | 91/536 |
| 4,987,822 A | 1/1991 | Stoll ........................... | 91/358 R |
| 5,053,685 A | 10/1991 | Bacchi ......................... | 318/135 |
| 5,087,845 A | 2/1992 | Behrens et al. ............... | 310/77 |
| 5,099,161 A | 3/1992 | Wolfbauer, III .............. | 310/80 |
| 5,121,042 A | 6/1992 | Ako ............................. | 318/657 |
| 5,234,386 A | 8/1993 | Nagai et al. ................. | 474/148 |
| 5,334,897 A * | 8/1994 | Ineson et al. ................. | 310/89 |
| 5,363,741 A | 11/1994 | Takada et al. ............... | 92/13.5 |
| 5,445,045 A | 8/1995 | Nagai et al. ............. | 74/490.09 |
| 5,491,372 A | 2/1996 | Erhart .......................... | 310/80 |
| 5,499,547 A | 3/1996 | Nagai et al. ............... | 74/89.34 |
| 5,557,154 A | 9/1996 | Erhart .......................... | 310/80 |
| 5,606,902 A | 3/1997 | Hosono et al. .................. | 92/88 |
| 5,614,778 A | 3/1997 | Terao et al. ................... | 310/80 |
| 5,617,772 A | 4/1997 | Hosono et al. ........... | 92/117 A |
| 5,637,940 A | 6/1997 | Nagai et al. .................. | 310/80 |
| 5,676,016 A | 10/1997 | Nagai et al. ............... | 74/89.32 |
| 5,685,390 A | 11/1997 | Chikuma et al. ........... | 180/444 |
| 5,689,994 A | 11/1997 | Nagai et al. ............... | 74/89.33 |
| 5,747,896 A * | 5/1998 | Nagai et al. .................. | 310/20 |
| 5,761,960 A | 6/1998 | Nagai et al. ............... | 74/89.33 |
| 5,784,922 A | 7/1998 | Ozaki et al. ............... | 74/89.37 |
| 5,796,187 A | 8/1998 | Nagai et al. .................. | 310/20 |
| 5,799,543 A | 9/1998 | Nagai et al. ............. | 74/490.09 |
| 5,809,831 A | 9/1998 | Nagai et al. ................ | 74/89.4 |
| 5,884,549 A | 3/1999 | Hosono et al. ................. | 92/54 |
| 5,912,520 A | 6/1999 | Kobayashi et al. ........... | 310/80 |
| 5,966,988 A | 10/1999 | Aiso et al. ................. | 74/89.34 |
| 6,000,292 A | 12/1999 | Nagai et al. ............... | 74/89.33 |
| 6,003,428 A | 12/1999 | Mundie et al. ................ | 91/459 |
| 6,145,395 A * | 11/2000 | Swanson et al. ........... | 74/89.33 |
| 6,177,743 B1 | 1/2001 | Hartramph et al. ........... | 310/89 |
| 6,186,770 B1 * | 2/2001 | Ziv-Av ....................... | 425/590 |
| 6,278,077 B1 * | 8/2001 | Cecil ........................ | 219/86.41 |
| 6,357,100 B2 * | 3/2002 | Speller et al. ........... | 29/407.09 |
| 6,362,547 B1 | 3/2002 | Peterson et al. .............. | 310/80 |

* cited by examiner

*Primary Examiner*—Burton S. Mullins
*Assistant Examiner*—Judson H. Jones
(74) *Attorney, Agent, or Firm*—Dorsey & Whitney LLP

(57) ABSTRACT

An electric actuator having an in-line rotation shaft, electric motor and encoder in which the encoder shaft, the motor shaft and the rotation shaft is concentric and integrally formed.

31 Claims, 8 Drawing Sheets

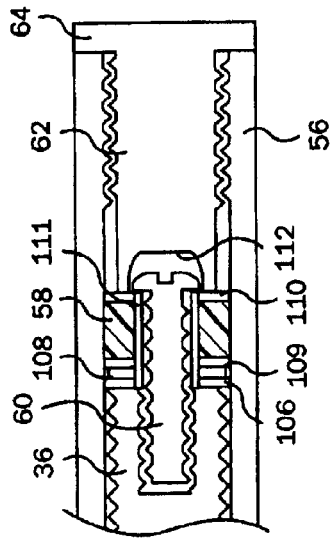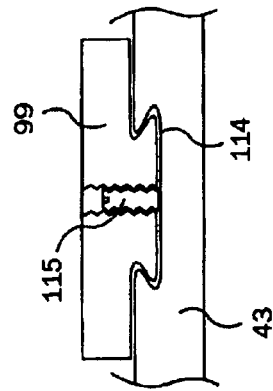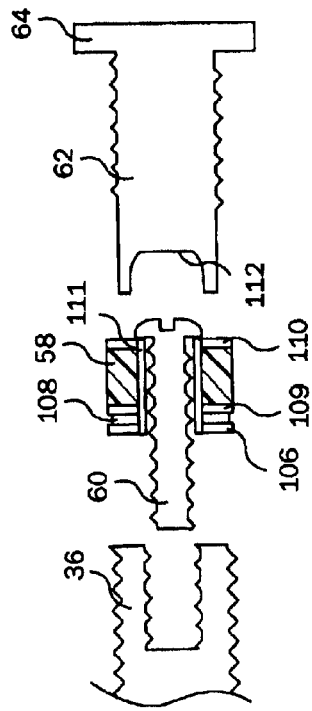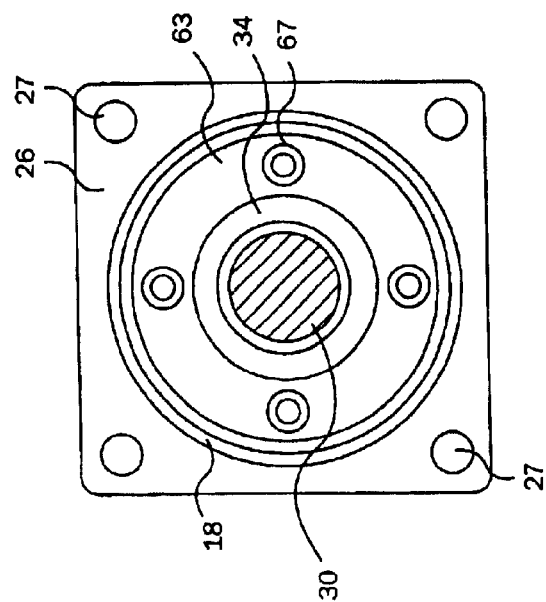
Fig. 8
Fig. 14
Fig. 7
Fig. 9

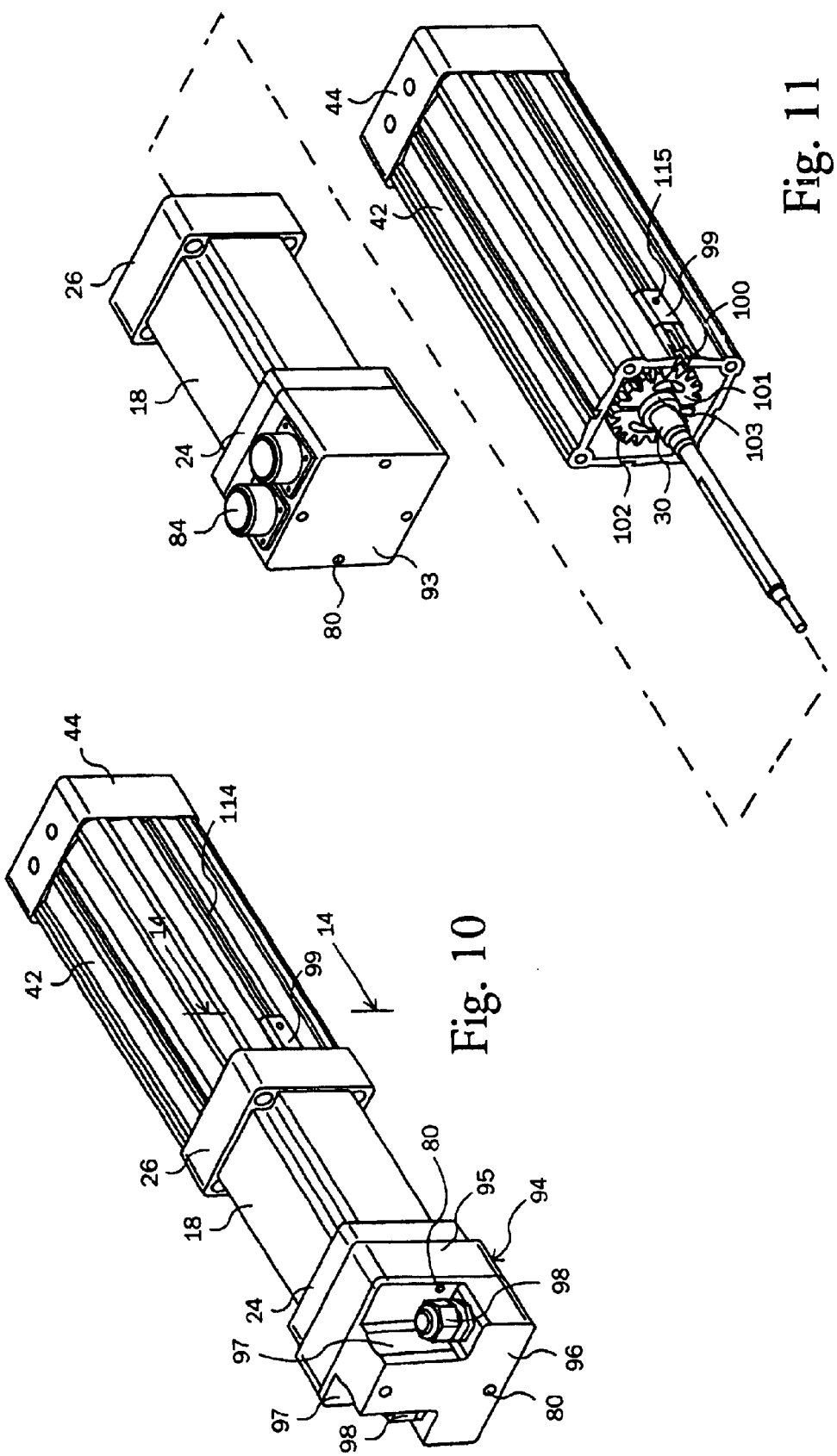

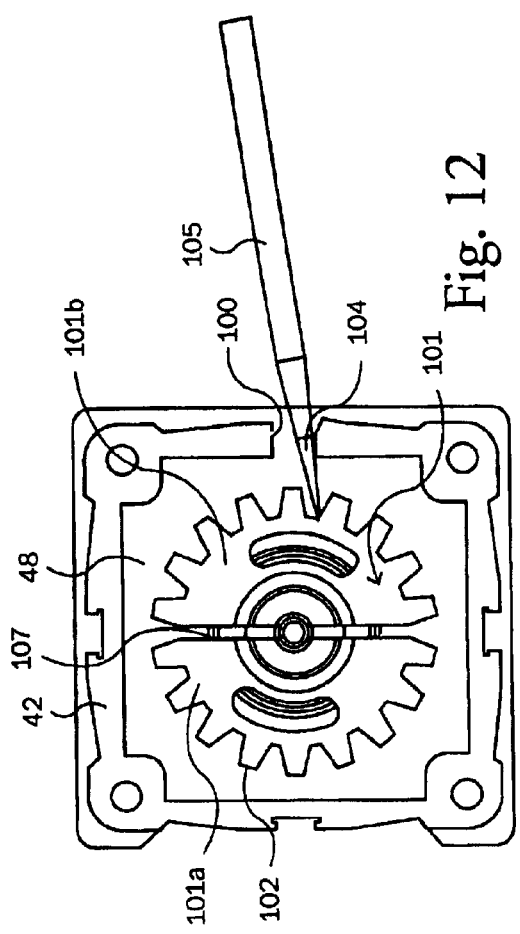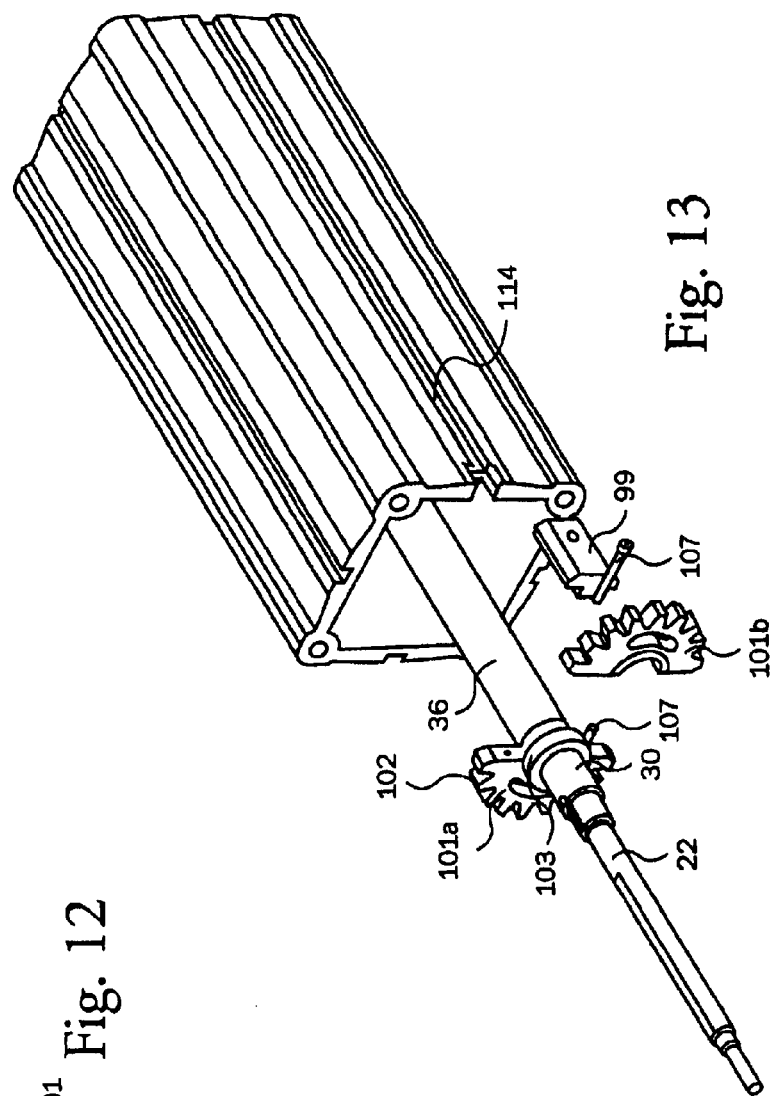

ELECTRIC ACTUATOR

This application claims the benefit of Provisional Application Serial No. 60/264,330, filed Jan. 26, 2001

BACKGROUND OF THE INVENTION

1. Field of the Art

The present invention relates generally to an electrically powered linear actuator and more particularly to an electrically powered actuator having an inline, direct motor mount and adapted for a variety of robotic or other applications. The invention has particular application to the control of robotic, pedestal or fixture welding guns and specifically, welding guns utilized in the automotive industry. The invention also has application to the actuation of clamping fixtures and the like in various industries such as the automotive industry.

2. The Prior Art

Various industries, and particularly the manufacturing industry, have utilized linear actuators to control the movements of automated welding guns, automated clamping fixtures, and the like. Specifically, in the automotive industry, actuation and control of welding guns and clamping fixtures has been accomplished using fluid actuators such as pneumatic or hydraulic actuators. While fluid actuators have functioned reasonably well for this purpose, they inherently embody various limitations. One, because of the possibility of leaks and failure of seals, etc. in the fluid actuators, there is always the concern of contamination of the worksite by a leaking fluid. Second, fluid actuators necessarily require a source of pressurized fluid and a fluid supply system. This leads to significant maintenance and other costs.

Accordingly, there is a need in the art for an improved actuator which overcomes the deficiencies and limitations of the prior art, and in particular, an improved actuator which is designed for use in controlling the movement of, and accommodating the loads associated with, welding guns, clamping fixtures and the like, such as those used in the automotive industry.

SUMMARY OF THE INVENTION

In contrast to the prior art, the present invention relates to an electric actuator having particular application to the actuation of welding guns, clamping fixtures or the like, and more particularly to the actuation of welding guns and clamping fixtures for use in the automotive manufacturing industry. In contrast to the fluid actuators of the prior art, the present invention provides an electrically powered in-line actuator which overcomes the limitations of the prior fluid actuators.

To minimize downtime and infra structure changes and the like during a changeover from existing fluid actuators to the electrically powered actuator of the present invention, the actuator of the present invention has been designed to fit within the same space or package and to be no heavier than existing fluid actuators, while at the same time providing at least comparable speed, thrust and range of movement. This is accomplished by utilizing a ball or roller screw electric actuator concept and by mounting the actuating motor in-line and directly to the actuator drive shaft. To provide additional advantages for maintenance or repair, the electric actuator of the present invention has also been designed to be comprised of a modular construction, thereby facilitating easy disassembly and substitution or repair of modular components.

To provide positioning accuracy to the actuator, a rotary or other similar encoder is provided. Like the motor, this encoder is provided in-line and in direct connection with the actuator drive shaft.

The actuator of the present invention also includes a means and mechanism for manually overriding the electrically powered actuator in the event of a loss of electrical power, actuator jamming or other actuator malfunction and a mechanism for enabling the actuator head and/or end cap to be rotated or mounted in a variety of different positions and/or configurations to accommodate different welding, clamping or actuation environments. In a preferred embodiment, a lubrication assembly is provided for insuring sufficient actuator lubrication and thus a reduction in maintenance. Means are also provided for accommodating the various loads (such as side loads) which are common with the actuation for welding guns and the like.

Accordingly, it is an object of the present invention to provide an improved actuator for welding guns, clamping fixtures and the like and more particularly for welding guns and clamping fixtures utilized in the automotive manufacturing industry.

Another object of the present invention is to provide an improved electrical actuator which can replace the conventional fluid actuators of the automotive manufacturing industry without sacrificing size or weight restrictions, while still maintaining comparable thrust, speed, range of movement and load accommodation.

A further object of the present invention is to provide an electric actuator having an in-line, direct motor mount and a manual override.

Another object of the present invention is to provide an electric actuator that eliminates or minimizes impact loading as the thrust tube reaches its innermost travel position.

Another object of the present invention is to provide an in-line electrical actuator in combination with an improved axial bearing retaining means.

A further object of the present invention is to provide an electric actuator with a thrust assembly bearing combination to resist side loads and to isolate the roller screw from any such side loads.

A still further object of the present invention is to provide an electrical actuator for use in the automotive manufacturing industry which provides for universal mounting arrangements.

A still further object of the present invention is to provide a lubrication system for the actuator.

These and other objects of the present invention will become apparent with reference to the drawings, the description of the preferred embodiment and the appended claims.

DESCRIPTION OF THE DRAWINGS

FIG. 7 is a fragmentary, partially exploded view, partially in section, of the means to relieve impact loading as the thrust tube reaches its innermost position.

FIG. 8 is a fragmentary view, partially in section, of the thrust tube and the means for relieving impact loading as the thrust tube reaches its innermost position.

FIG. 9 is a view, partially in section, as viewed along the line 9—9 of FIG. 2.

FIG. 10 is an isometric view of a further embodiment of the actuator of the present invention showing a modified power supply end.

FIG. 11 is an isometric, exploded view of a further embodiment of an actuator in accordance with the present invention showing a further manual override mechanism.

FIG. 12 is a view, partially in section, showing the override mechanism of FIG. 11.

FIG. 13 is an exploded, fragmentary isometric view showing portions of the override gear of FIGS. 11 and 12.

FIG. 14 is a view, partially in section, as viewed along the line 13—13 of FIG. 10.

DESCRIPTION OF THE PREFERRED EMBODIMENT

The present invention provides an improved actuator for use in providing controlled and accurate linear movement to a work piece. Although the actuator of the present invention has applicability to a variety of work pieces and in a variety of industries, it has particular application to the actuation of welding guns, clamping fixtures and the like for use in the automotive manufacturing industry. Accordingly, the preferred embodiment will be described with respect to the application of the present invention to welding guns, clamping fixtures or the like, without any implication that the present invention is limited to that application.

Figure 1:
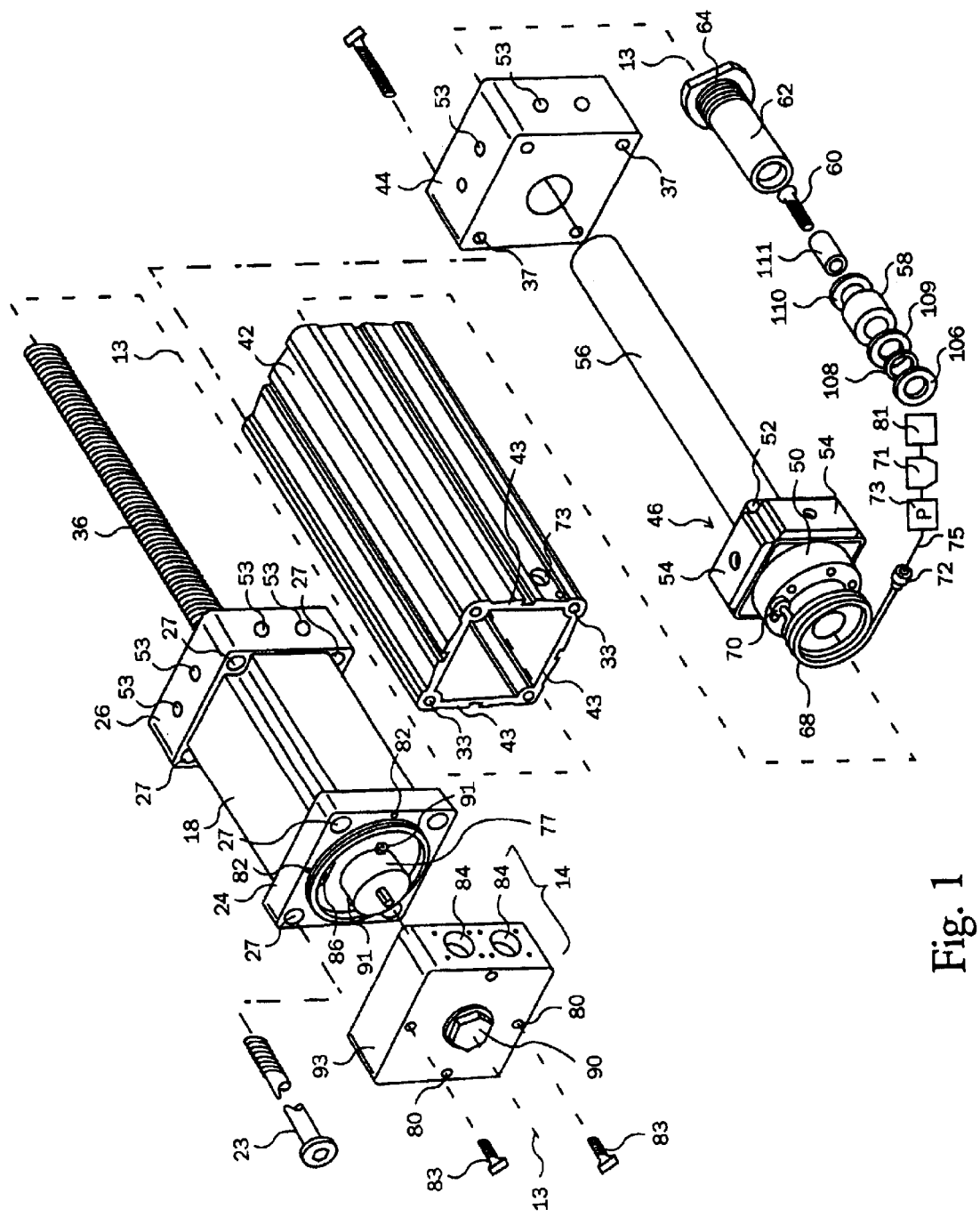
FIG. 1 is an isometric, exploded view of the actuator of the present invention.
Figure 2:
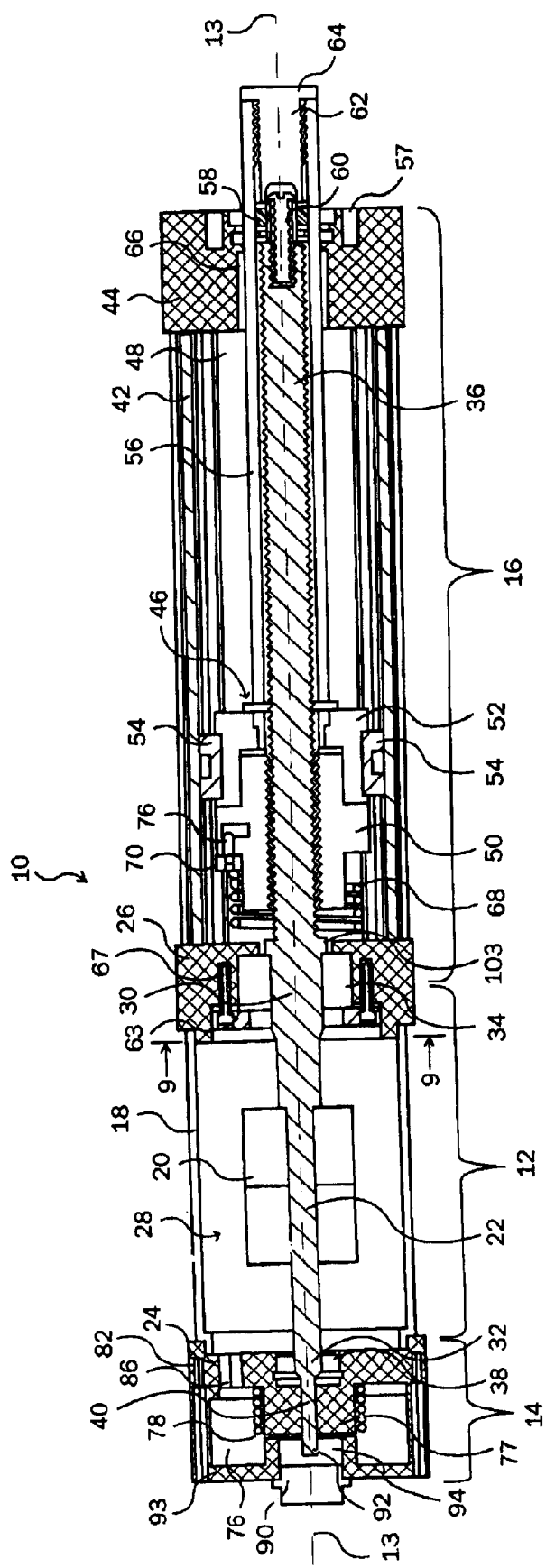
FIG. 2 is a view, partially in section, of the actuator in accordance with the present invention as viewed along a plane extending along and through the longitudinal axis of the actuator.
Figure 15:
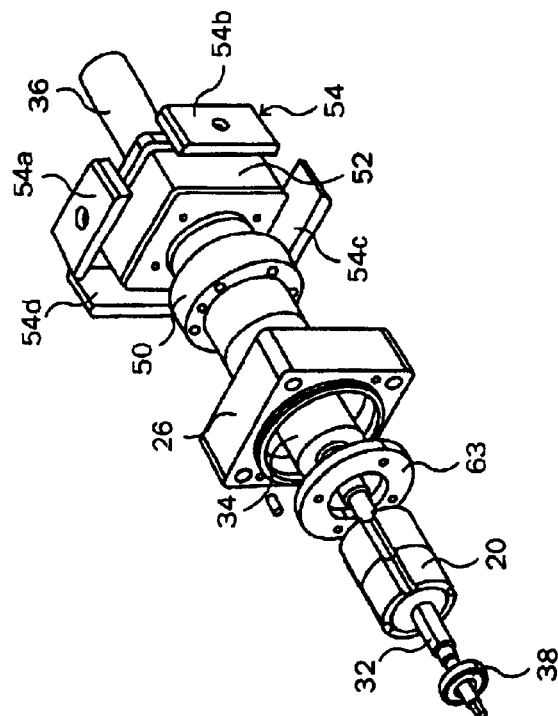
FIG. 15 is an isometric, exploded view showing the motor and bearing assembly and a portion of the thrust assembly.

In describing the preferred embodiment of the present invention, reference is first made to FIGS. 1, 2 and 15 comprising exploded and sectional views of the actuator or portions thereof. In general, the actuator of the present invention is an electrically powered, in-line actuator in which the electric motor powering means is connected directly to, and in-line with, the roller or lead screw of the actuator. In describing the actuator of the present invention, the terms "proximal" and "distal" are used to define directions/orientations relative to the actuator. Specifically, the term "proximal" shall mean toward the encoder or motor end of the actuator while the term "distal" shall mean toward the work piece connection end. In general, the actuator includes a motor or rotational motion generating section 12, a proximal or control and electric power supply end 14 and a distal or thrust and work piece connection end 16 (FIG. 2).

The motor section 12 is positioned between the ends 14 and 16 and includes an outer motor housing 18, a bearing plate or block 24 at its proximal end and a bearing plate or block 26 at its distal end. Positioned within the housing 18 is an electric motor 28 with conventional electric motor windings and other functional elements 20 and a motor drive shaft 22. The motor drive shaft 22 is centrally positioned within the housing 18 along the longitudinal axis 13 of the actuator and extends between the bearing blocks 24 and 26.

The motor shaft 22 includes a distal end portion 30 which is rotatably supported within the bearing block 26 by the bearing 34 and a proximal end portion 32 which is rotatably supported by the bearing 38 in the bearing block 24. Both of the shaft portions 30 and 32 are integrally formed with and coaxial or in-line with the drive shaft 22 along the longitudinal axis 13. Further, as will be described below the shaft portion 30 is integrally formed with a threaded roller screw 36 and the shaft portion 32 is integrally formed with an encoder shaft extension 40 to support a rotary encoder 77.

As shown in the drawings, the motor shaft 22, the roller screw 36 and the encoder shaft extension 40 are concentric, inline and integrally formed from a single piece of shaft stock. Accordingly, at least all axial movement of or loads against the thrust tube 56 and the thrust tube assembly 46 is resisted by the screw 36. Because any axial movement of the shaft extension 40 and thus the encoder 77, beyond minimal tolerances, will tend to adversely affect the encoder 77 and the accuracy thereof, the shaft 36 must be axially captured relative to the housing 42 and the bearing block 26 to prevent or minimize any such movement.

To axially capture the screw 36 relative to the bearing block 26, the bearing 34 is press fit onto the shaft portion 30 so that its distal axial edge engages a bearing stop 103 which is integrally formed in the shaft portion 30. The proximal axial edge of the bearing 34 is secured relative to the bearing block 26 by a bearing retaining plate 63. As shown best in FIGS. 2, 9 and 15, the bearing plate 63 has a generally annular configuration and is rigidly connected to the bearing block 26 by plurality of threaded screws 67. Unlike conventional bearing retaining rings, washers or the like which permit some limited axial movement of the bearing and thus the shaft on which it is mounted, the bearing plate 63 connected to the bearing block 26 by the screws 67 to axially capture the screw 36 relative to the block 26 and to prevent or minimize any axial movement thereof, beyond minimal acceptable tolerances. This assures accuracy of the encoder 77.

The thrust section 16 of the actuator 10 includes a thrust tube housing 42 and a thrust tube head 44. The thrust tube housing 42 is rigidly connected between the bearing block 26 and the head 44 by a plurality of elongated threaded members 23 and 47 to define an internal thrust tube chamber 48. As shown in FIG. 1, four cap screws 23 extend through the four corner holes 27 in the bearing block 24 and the four corner holes in the bearing block 26 and into corresponding threaded holes 33 in the tube housing 42. Similarly, four cap screws 47 extend through the four corner holes 37 in the tube head 44 and into corresponding threaded holes (not shown) in the housing 42.

Each of the bearing blocks 26 and the tube head 44 is provided with a plurality of mounting holes 53 to mount the actuator relative to a fixed support (not shown). Although mounting holes 53 are shown on only two sides of the bearing block 26 and tube head 44, such mounting holes can be provided on all four sides to provide maximum mounting flexibility. Alternate mounting holes 57 (FIG. 2) are also provided in the end surface of the tube head 44. These mounting holes 57 are internally threaded and extend axially relative to the longitudinal axis 13.

As shown, the housing 42 is elongated, is generally parallel to the longitudinal axis 13 of the actuator and includes a plurality of sidewalls 43. The length of the housing 42 may vary depending on the desired movement range or function of the actuator. The housing 42, and thus the interior of the thrust chamber 48, has a square or multi-sided cross-sectional configuration. Although the housing may be constructed of a variety of materials, it is preferably extruded and constructed of a lightweight metal or metal alloy such as aluminum.

Positioned within the chamber 48 is a thrust tube assembly 46 which includes a roller screw nut 50, a roller screw coupler 52, a bearing or guide means 54 and a thrust tube 56. As illustrated best in FIGS. 2 and 6, the roller screw shaft or lead screw 36 extends from the motor shaft 22, through the tube assembly 46 and toward the head 44. The roller screw 36 is provided on its outer surface with continuous threads and, in the preferred embodiment, is integrally formed with and in axial alignment with the motor shaft 22 and its distal extension 30. Thus, the screw 36 rotates with the motor shaft 22. A compressible bumper 58 and impact loading relief assembly as described below are connected to the distal or outer end of the roller screw 36 by a screw 60 or other threaded member. The roller screw 36 is unsupported at its free end other than by the internal wall of the thrust tube 56.

The impact loading relief assembly for the actuator of the present invention is shown generally in FIG. I and more specifically in FIGS. 7 and 8. This assembly includes the compressible bumper 58 and the plurality or rings or disc members 106, 108, 109 and 110. During operation of the actuator, the roller screw 36 rotates in one direction or the other to result in corresponding axial movement of the thrust tube 56 and thus the thrust rod end 62. During this axial movement, the thrust tube 56 and end 62 remain rotationally fixed. As the thrust tube 56 and the end 62 reach their innermost, retracted position, the rotating screw 36 and its associated impact relief assembly will often engage the inner end of the thrust rod end 62 as shown in FIG. 8. Because the connection end 62 is rigidly secured to the screw nut 50 which is threadedly received on the screw 36, any rotation of the shaft 36 after such initial engagement causes the end 62 to be pulled tighter toward the shaft 35 with the compressible bumper or cushion 58 sandwiched therebetween. In the preferred embodiment, this compressible material is urethane. Thus, the bumper 58 functions to relieve the axial component of any impact loading between the end 62 and the screw 36.

The rotational component of impact loading between the screw 36 and the thrust tube 56 and end 62 is caused by the continued limited rotation of the screw 36 after initial engagement. This rotational component of impact loading is relieved by means which permits limited rotational movement between the screw 36 and the bumper 58. In the preferred embodiment, this means includes the pair of steel rings or discs 106 and 109 positioned on opposite sides of a self-lubricating, low friction ring or disc 108 at the proximal end of the bumper 58. Preferably, the ring 108 is constructed of a self-lubricating brass material commonly referred to as oilite. A further ring or disc 110 is positioned at the distal end of the bumper 58 as shown so that the bumper 58 is sandwiched between the washers 109 and 110. A tube or sleeve 111 is positioned over the threaded member 60 to support the rings 106, 108, 109, 110 and the bumper 58 as shown. The screw 60 is threadedly received by the distal end of the screw 36 as shown. During impact loading, the proximal edge surface of the thrust rod end 62 engages the ring 110.

Accordingly, it can be seen that the impact loading relief assembly or means in accordance with the present invention includes a means for relieving both the axial and rotational components of impact loading as the thrust tube reaches its innermost proximal position. Although the means for relieving the axial component is shown as the urethane bumper 58, this can include other compressible structure which permits limited axial movement of the end 62 relative to the threaded screw 36 after impact. Similarly, although the preferred embodiment discloses the low friction disc 108 sandwiched between the discs 106 and 109 as the means for relieving the rotational component of impact loading, such means can be comprised of various other structures such as a variety of bearing members which permit limited rotational movement of the threaded screw 36 relative to the bumper 58 or other axial relief means after impact. Further, although the preferred embodiment shows the impact loading relief assembly as being threadedly received in the end of the screw 36, it could also be threadedly received in the end 62.

The roller screw nut 50 is a conventional roller screw nut having a plurality of planetary or peripherally positioned roller screws. During operation of the actuator, these planetary roller screws engage the outer threads of the roller screw shaft 36 and remain rotationally fixed relative to the housing 42 to convert the rotational movement of the shaft 36 into axial movement of the thrust tube assembly 46. Thus, the assembly 46 moves axially between a retracted position shown in FIG. 2 and various extended positions such as that shown in FIG. 6. Roller screw nuts 50 of the type usable in the preferred embodiment of the present invention are available commercially such as roller screw nuts provided by Rollvis of Switzerland or SKF of Japan, among others. The coupler 52 is rigidly secured to the roller screw nut 50 and functions to rigidly secure the nut 50 to the inner or proximal end of the thrust tube 56. The outer or distal end of the thrust tube 56 is provided with a thrust rod end 62. The rod end 62 is rigidly connected to the thrust tube 56 by threads or other appropriate means and includes a connection end 64 such as a threaded connection or the like, for connection to a work piece. In the preferred embodiment, the work piece could be a welding gun, a clamping fixture or the like. The thrust tube 56 is guided and supported for axial movement relative to the head 44 by the bearing 66 positioned between a portion of the head 44 and external surface of the thrust tube 56.

The bearing 54 which guides axial movement of the thrust assembly within the housing 42 is rigidly connected to the roller screw coupler 52 as shown in FIGS. 1, 2 and 15. The bearing 54 extends around the entire periphery of the coupler 52 and is positioned between the coupler 52 and the inner surface of the thrust tube housing 42 for the purpose of guiding the thrust tube assembly 46 axially along the roller screw shaft within the chamber 48. As shown best in FIGS. 1, 2 and 15, the bearing 54 is comprised of four individual bearing members 54(*a–d*) having generally flat exterior guide surfaces to engage the inner, longitudinally extending flat surfaces of the four sidewalls 43 of the thrust tube housing 42 and to prevent rotation of the thrust tube assembly 46 as the roller screw 36 rotates. The individual bearing members of the bearing 54 are preferably constructed of Delron or other synthetic, low friction material. The bearing 54 in combination with the bearing 66, which is also preferably constructed of a low friction, synthetic bearing material, functions to capture the axially moveable thrust assembly 46 relative to the housing 42 and to resist side load force on the distal end of the tube 56 during operation. Thus, with this bearing combination, the roller screw 36 is isolated from any side loading on the distal end of the tube 56 or any other portion of the assembly 46. This is particularly important for a linear actuator which is intended for use in an environment where the possibility of significant side loads exist, such as the actuation of welding guns, clamping fixtures or the like.

Figure 6:
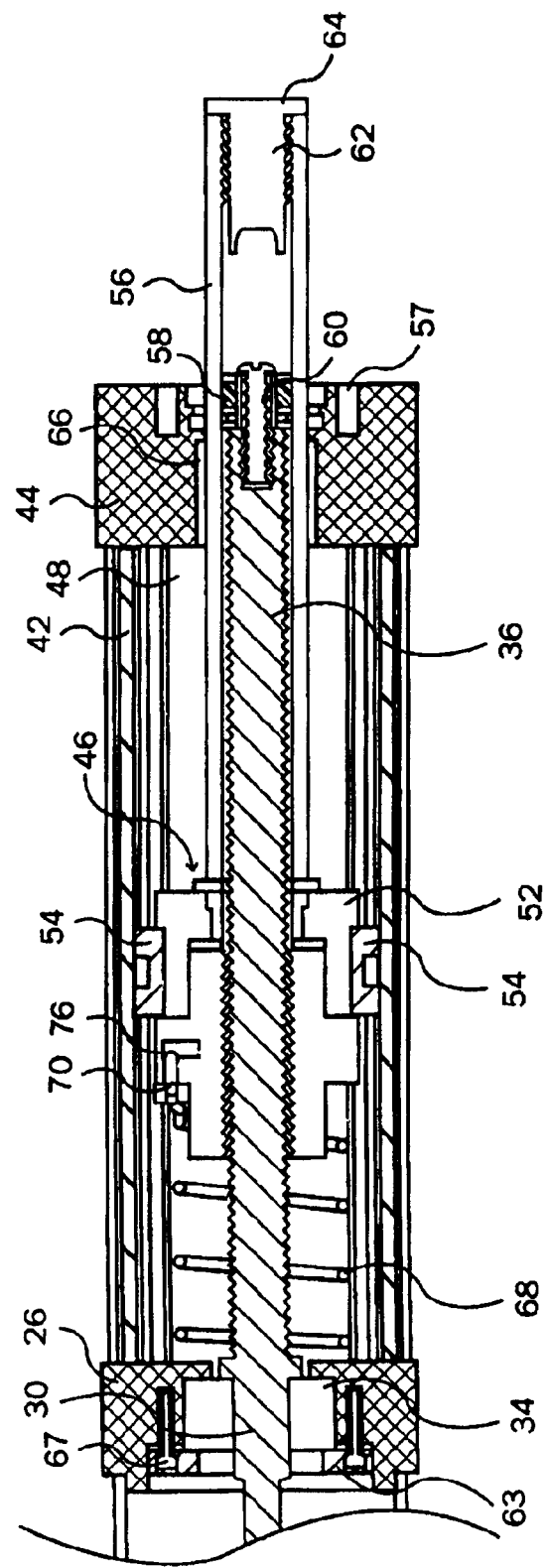
FIG. 6 is a view, partially in section and similar to FIG. 2, showing a portion of the actuator with the tube assembly in a partially extended position.

As shown best in FIGS. 1, 2 and 6, a lubrication assembly is provided for lubricating the roller screw nut 50 and the roller screw shaft 36 during use. This assembly includes a lubrication delivery tube in the form of the coiled, flexible tube 68. The coiled tube 68 extends between a lubrication port 73 (FIG. 1) in the wall of the thrust tube housing 42 and a lubrication port 76 (FIGS. 2 and 6) in the roller screw nut 50. The tube 68 is provided with lubrication fittings 72 and 70 at its ends for operative connection with the lubrication ports 73 and 76, respectively. The lubrication fitting 72 which connects with the port 73 may be provided with a zerk or other fitting for periodic manual lubrication or can be provided with a continuous supply of lubrication for automatic lubrication of the roller screw nut 50 and roller screw shaft 36. The coiled delivery tube 68 enables the roller screw nut 50 and the entire thrust assembly 46 to move reciprocally within the thrust chamber 48 along the roller screw shaft 36 (as shown in FIGS. 2 and 6) while maintaining lubrication during the entire such movement. If automatic lubrication is desired, a lubrication pump 74 may be provided to supply grease or other lubrication to the tube 68 through a lubrication supply tube 75 connected with the fitting 72. The pump 74 may be connected with a lubrication reservoir 71 via the supply line 79, with the operation of the pump 74 controlled by a controller 81. In some cases, the tube 68 can be eliminated. In these cases, lubrication is packed into the interior of the nut 50 through the port 76 prior to use.

The proximal or control and power supply end 14 of the actuator includes an extension 40 of the motor shaft 22 and a rotary encoder 77 mounted to the shaft extension 40. The rotary encoder 77 is a conventional rotary encoder which includes a pair of connection tabs or ears 91 for connecting the encoder 77 to the bearing plate 24. In the preferred embodiment, the shaft extension 40 is integrally formed with and is axially aligned with the proximal shaft portion 32 and thus the motor shaft 22. In the embodiment shown in FIGS. 1–5, a further shaft extension 92 extends outwardly from the proximal end surface of the encoder 77. This further extension 92 is integrally formed with the extension 40 and thus the main motor shaft 22 and is aligned with the axial center of the shaft 22 and the extension 40. Preferably, the extension 92 is provided with a hexagonal end or a pair of flats or other rotation means to provide a manual rotation mechanism or override for the shaft 22. This manual override permits the motor shaft 22 and thus the roller screw shaft 36 to be manually rotated if necessary or desired. This need might arise in the event of a power outage, a malfunction of the actuator or power system or when the system becomes locked (i.e., the screw 36 driven against the end 62) at the end of the stroke.

A cover 93 is connected with the proximal end of the bearing plate 24. The cover 93 has a generally hollow interior to define a chamber 76 (FIG. 2) to house the encoder 77 and the electrical power supply wires 78 (FIGS. 3, 4 and 5) and to keep such elements free from dust and other contaminants. As shown best in FIG. 1, the cover 93 is provided with a plurality of connection openings 80. These openings 80 are aligned with corresponding threaded openings 82 in the bearing plate 24. Threaded members 83 extend through the openings 80 and are received by the threaded openings 82 to secure the cover 93 to the bearing plate 24. In the preferred embodiment, the position of the openings 80 and 82 are symetrically positioned. This enables the cover 93 to be connected with the bearing plate 24 in several (at least three) different rotational positions. One edge of the cover 93 is provided with one or more electrical access openings 84 to provide electrical power to the motor 28 and communicate control signals between the encoder and a control means (not shown).

Figure 5:
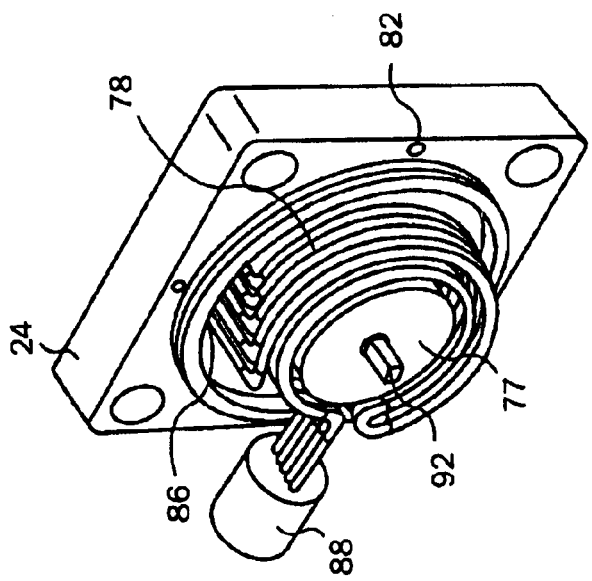
FIGS. 3, 4 and 5 are isometric views of the bearing plate at the proximal end of the motor showing different orientations and positions for the electrical supply.
Figure 4:
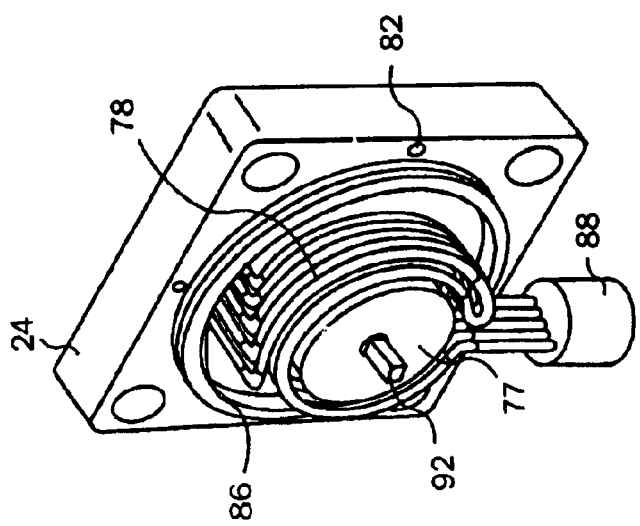
Figure 3:
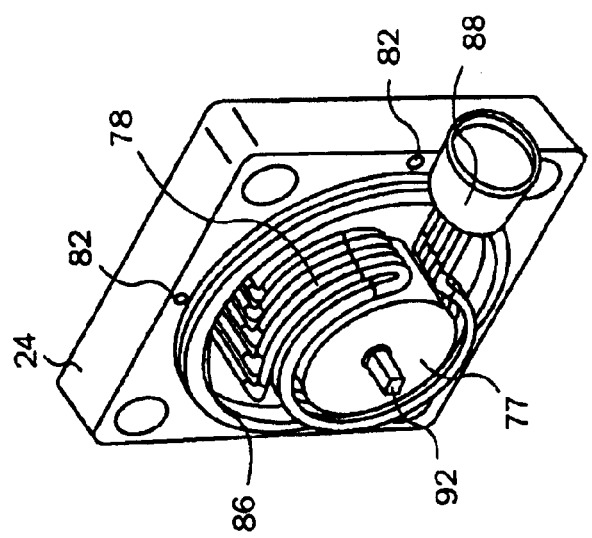

As illustrated best in FIGS. 3, 4 and 5, electrical power and actuator control signals are communicated to and from the encoder 77 and the motor 28 via the plurality of electrical leads or wires 78. These leads 78 are provided to the motor 28 through the electrical port 86 in the bearing plate 24. The ends of the leads 78 are mounted to a connector 88 which is in turn connected with the cover 93 at one of the electrical access openings 84. The leads 78 between the electrical port 86 and the connector 88 are preferably coiled such as is shown in FIGS. 3, 4 and 5 to permit the cover 93 to be connected to the bearing plate 24 in any one of at least three rotational positions through an angle of about 270°. With this connection flexibility, a single actuator can be modified or adjusted to fit a variety of different power supply positions merely by rotating the cover 93.

A motor shaft access cover 90 provides rotational access to the shaft extension 92 through an opening 94 in the cover 93. The access cover 90 is preferably provided with exterior threads to be received by internal threads in the cover 93 and is designed for selective manual rotation and thus removal. When removed, access is provided to the shaft extension 92 through the opening 94 so that the extension 92 and the entire motor shaft 22 and roller screw shaft 36 can be manually rotated by a wrench or other tool if desired.

With the structure in accordance with the present invention, axial movement of the fixture connection end 64 of the thrust tube assembly 46, and thus the welding gun or other fixture attached thereto, can be precisely and accurately controlled by rotation of the motor shaft 22. As the motor shaft 22 and thus the roller screw shaft 36 rotates in a first rotational direction, this rotational movement is converted to an axial movement of the thrust tube assembly 46 and thus the fixture end 64 and attached fixture in a first axial direction such as from the retracted position shown in FIG. 2 to the partially extended position shown in FIG. 6. Such axial movement is along the longitudinal axis of the actuator. Likewise, rotation of the motor shaft 22 in the opposite or second direction results in axial movement of the thrust assembly and thus the fixture connection end 64 and attached fixture in an opposite second axial direction such as from the partially extended position of FIG. 6 toward the retracted position of FIG. 2. Precise rotational movement of the motor shaft 22 and thus axial movement of the fixture connection end 64 and attached fixture is controlled via the rotary encoder 77 together with appropriate control means (not shown). Such control means are well known in the art.

In the preferred embodiment, the actuator is generally provided with a lead of about two millimeters (mm) to six millimeters (mm) and preferably about four millimeters (mm). For purposes of the present invention, the "lead" as used in this context is the axial distance which the thrust assembly 46 and thus the connected fixture will advance during one revolution of the roller screw shaft 36. By reducing the lead for a particular actuator, by increasing the thread density, a commensurate reduction in motor size can be made without jeopardizing any thrust. Although speed of movement may be jeopardized somewhat, this is generally not a major issue. Accordingly, with a smaller lead, and thus a smaller motor, the entire package size of an actuator for a given application can be reduced.

FIG. 10 shows a further embodiment of the actuator in accordance with the present invention with a modified power connection end. As shown, the modified power connection end includes a distal portion 95 and a proximal portion 96. The proximal portion 96 includes a pair of recessed corner sections 97,97. Positioned within the recessed sections 97,97 are a pair of electrical connection posts or grommets 98,98. As shown, the recessed sections 97,97 are sufficiently large to totally enclose the connection posts 98,98 and to prevent any portion of the posts 98,98 from extending beyond the outer surfaces of the portions 95 or 96. Like the cover 93, the modified connection end includes a plurality of holes 80 to permit connection to the proximal bearing block 24.

The recessed connector post or grommet embodiment shown in FIG. 10 is preferred, in some cases, over the embodiments of FIGS. 1 and 8 to better protect the connector posts and to prevent them from being ripped off or otherwise damaged in collisions with robots or other machinery. The embodiment of FIG. 10 also provides flexibility for the electrical supply cables to be connected so that they extend from the actuator in any orientation to best conceal the connections and keep them away from interfering structure.

FIGS. 11, 12 and 13 show a modified manual override or means for permitting the roller screw 36 to be manually rotated. This override means includes a rotation member in the form of the toothed wheel or override gear 101 and an access opening 100. The wheel or gear 101 is mounted to a portion of the shaft extension 30 for rotation therewith and includes a plurality of teeth 102 positioned about its periphery. As shown best in FIGS. 12 and 13, the gear 101 is formed of two half sections 101a and 101b which are retained or clamped together for mounting on the shaft section 30 by a pair of set screws 107. As shown, the outer diametrical dimension of the gear 101 is less than the width of the chamber 48 and is axially positioned on the shaft section 30 so that the wheel 101, and thus its peripheral teeth 102, are aligned with the access opening 100. Preferably, the gear 101 is mounted on the distal side of the bearing stop 103. The opening 100 is provided in one of the sidewalls of the housing 42 and is sufficiently large to permit a tool such as the end 104 of a screwdriver 105 to be inserted through the opening 100 for engagement with the teeth 102. In this manner, if desired, the tool 105 can be used to manually rotate the wheel 101 and thus the roller shaft 36.

To prevent dust and other contamination from entering the interior of the chamber 48 through the access opening 100, a closure means 99 is provided to close the opening 100 during normal operation of the actuator. In the preferred embodiment, this closure means is in the form of a sliding window or gate 99 which is slideable between a closed position shown in FIG. 10 and an open, access position shown in FIG. 11. As shown in FIG. 14, the closure means 99 is configured to be slideable in a slot or groove 114 in an exterior surface of one of the sidewalls 43 and retained in a closed position by the set screw 115. To retain the closure 99 in a closed position, the screw 115 is advanced against the groove 114 as shown.

Accordingly, it can be seen that the actuator modification illustrated in FIGS. 10–14 includes a rotation member connected with the roller screw 36 and a selectively openable closure means for access to the rotation member to permit manual rotation thereof.

Although the preferred embodiments of the present invention are described with respect to a roller screw with planetary roller screws, it is contemplated that other means such as a ball screw or the like, among others, can also be used to convert the rotational movement of the roller screw shaft 36 into axial motion of the thrust tube assembly 46.

Figure 16:
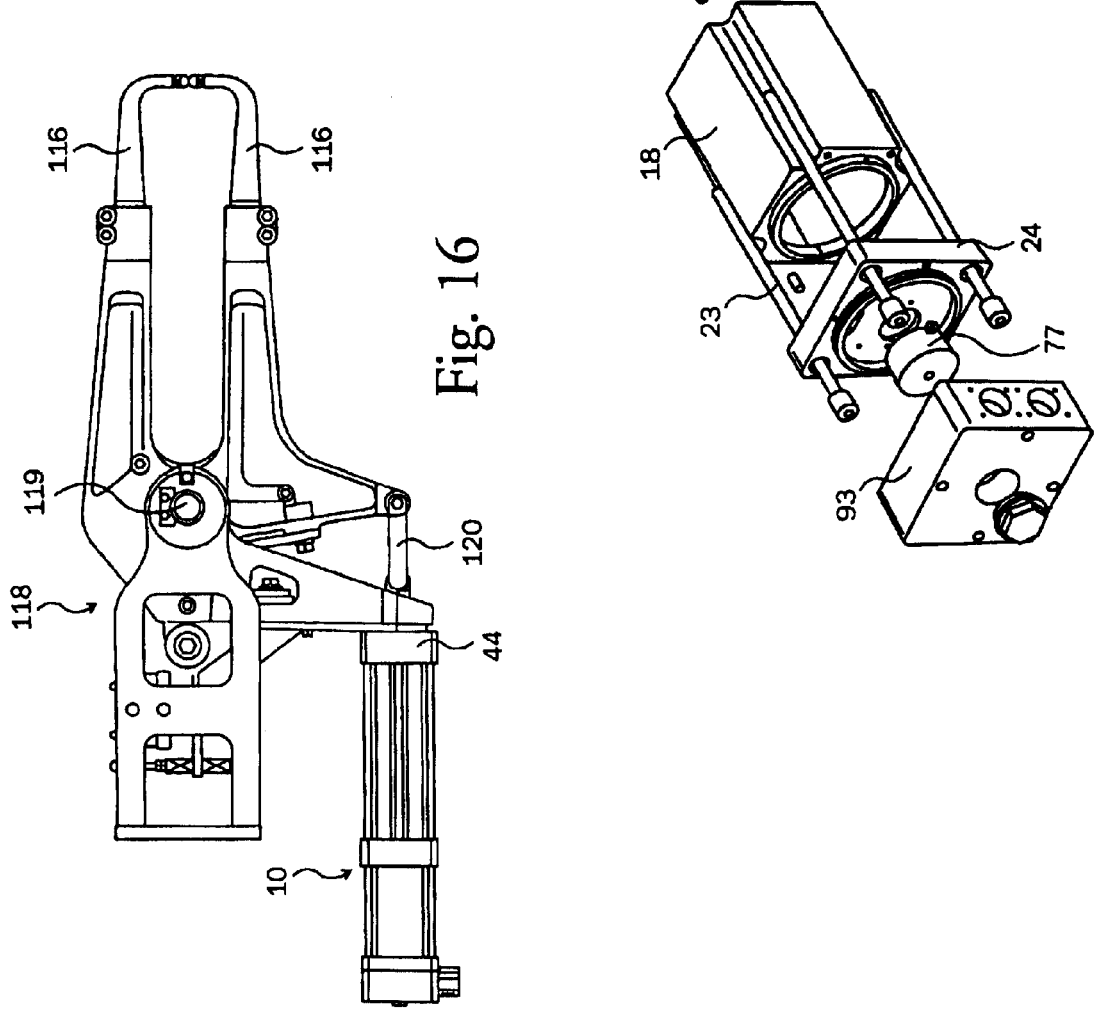
FIG. 16 is an electrical side view showing a welding apparatus in accordance with the present invention comprising an electric actuator as described herein in combination with a welding gun.

FIG. 16 shows a welding apparatus comprising the combination of a welding gun or fixture 118 with the actuator 10 of the present invention. Specifically, the welding gun or fixture 118 includes a pair of welding tips 116,116 which are pivotable about the pivot 119. At least one of the heads 116 is operatively connected to an actuation link 120 which is turn operatively connected with the connection end 62 (FIGS. 1, 2 and 6) of the actuator. As can be seen, although the actuation through the link 120 is generally linear, there can be significant side loads applied to the actuator by the welding gun 118. This is due to the fact that the application of the load is offset from the longitudinal axis of the actuator and the link 120 moves through an arc. In the embodiment of FIG. 16, the welding gun 118 is connected to the forward head 44 of the actuator by a plurality of cap screws.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. An electrically powered actuator comprising:
   an elongated housing having a proximal end defined by a proximal end block, a distal end defined by a distal end block and a longitudinal axis;
   a rotation shaft extending along said longitudinal axis and being rotatably supported within and axially fixed relative to said housing and having a proximal end and a distal end;
   a thrust member having a proximal end and a distal end, said thrust member being concentric with, and axially moveable relative to, said rotation shaft and said housing along said longitudinal axis, said thrust member further extending through said distal end block, with the distal end of said thrust member extending beyond and being axially moveable beyond said distal end block;
   a coupling nut connected with said thrust member and moveable therewith, said thrust member and said coupling nut being non-rotatable relative to said housing;
   an electric motor having an output drive shaft extending therethrough, said drive shaft having a proximal end on one side of said motor and a distal end on the other side of said motor, said output drive shaft being in-line and concentric with said rotation shaft, with the distal end of said drive shaft connected with the proximal end of said rotation shaft; and
   a rotary positioning encoder mounted to the proximal end of said output drive shaft.

2. The actuator of claim 1 wherein said coupling nut is a planetary roller screw nut.

3. The actuator of claim 1 wherein the proximal end of said thrust member is connected with said coupling nut and the distal end of said thrust member is a free end for connection with a fixture.

4. The actuator of claim 1 wherein the proximal end of said output drive shaft extends through said encoder and includes a manually rotatable end.

5. The actuator of claim 4 including a head cover having an access opening t provide access to said manually rotatable end.

6. The actuator of claim 5 wherein said access opening includes a selectively removeable plug to provide selective access to said manually rotatable end.

7. The actuator of claim 1 including a motor housing having a distal end connected with said elongated housing and a proximal end and further including a head cover connected with the proximal end of said motor housing.

8. The actuator of claim 1 including an override rotation member connected to one of said rotation shaft and said drive shaft for rotation therewith.

9. The actuator of claim 8 wherein said rotation member is an override gear having a plurality of peripheral teeth.

10. The actuator of claim 8 including a selectively operable access opening in alignment with said rotation member to provide manual rotation access to said rotation member.

11. The actuator of claim 1 including a bearing block positioned between said housing and said electric motor and a bearing mounted on said output drive shaft and within said bearing block.

12. The actuator of claim 11 wherein said rotation shaft includes a distal free end wherein said bearing includes a distal end and a proximal end and wherein one of said output drive shaft and said rotation shaft includes a bearing stop.

13. The actuator of claim 12 wherein said distal end of said bearing engages said bearing stop and said proximal end of said bearing is retained by a bearing plate connected with said bearing block.

14. The actuator of claim 1 wherein said actuator includes a distal end and a proximal end and further includes an electrical supply head cover connected with said motor, wherein said head cover includes an exterior surface and first and second recessed portions and further includes first and second electrical connector posts positioned in said first and second recessed portions.

15. The actuator of claim 1 wherein said bearing comprises at least one low friction disc.

16. An electrically powered actuator comprising:
an elongated housing having a longitudinal axis;
a rotation shaft extending along said longitudinal axis and being rotatably supported within said housing member;
a thrust member concentric with, and axially moveable relative to, said rotation shaft along said longitudinal axis;
a coupling nut connected with said thrust member and moveable therewith, said thrust member and said coupling nut being non-rotatable relative to said housing member;
an electric motor having an output drive shaft, said output drive shaft being in-line and concentric with, and integrally formed with said rotation shaft; and
a motor housing having a distal end connected with said elongated housing and a proximal end and further including a head cover connected with the proximal end of said motor housing, wherein said head cover includes a first head section and a second head section, said second head section being selectively connectable to said first head section in a plurality of positions.

17. The actuator of claim 16 wherein said second head section includes an external electrical connection member.

18. The actuator of claim 17 wherein said external electrical connection member is electrically connected with said motor regardless of the position of said second head section relative to said first head section.

19. An electrically powered actuator comprising:
an elongated housing having a longitudinal axis;
a rotation shaft extending along said longitudinal axis and being rotatably supported within said housing member;
a thrust member concentric with, and axially moveable relative to, said rotation shaft along said longitudinal axis;
a coupling nut connected with said thrust member and moveable therewith, said thrust member and said coupling nut being non-rotatable relative to said housing member;
an electric motor having an output drive shaft, said output drive shaft being in-line and concentric with, and integrally formed with said rotation shaft; and
a first bearing between said coupling nut and a first portion of said housing and a second bearing between said thrust member and a second portion of said housing.

20. The actuator of claim 19 wherein said thrust member includes a thrust tube with an exterior surface and said housing includes a tube head and wherein said second bearing is positioned between a portion of said tube head and said exterior surface of said thrust tube.

21. An electrically powered actuator comprising:
an elongated housing having a longitudinal axis;
a rotation shaft including a distal free end, extending along said longitudinal axis and being rotatably supported within said housing member;
a thrust member concentric with, and axially moveable relative to, said rotation shaft along said longitudinal axis;
a coupling nut connected with said thrust member and moveable therewith, said thrust member and said coupling nut being non-rotatable relative to said housing member;
an electric motor having an output drive shaft, said output drive shaft being in-line and concentric with, and integrally formed with said rotation shaft; and
a bearing block positioned between said housing and said electric motor and a bearing mounted on said output drive shaft and within said bearing block wherein one of said output drive shaft and said rotation shaft includes a bearing stop and wherein said bearing includes a distal end which engages said bearing stop and a proximal end which is retained by a bearing plate connected with said bearing block, wherein said bearing plate is connected to said bearing block by a plurality of threaded members.

22. An electrically powered actuator comprising:
a housing having a proximal end and a distal end;
a rotation shaft within said housing and having a drive shaft portion extending toward the proximal end of said housing and a lead screw portion having a free end extending toward the distal end of said housing;
an electrical motor connected to drive said drive shaft;
a rotary encoder connected with said drive shaft near the proximal end of said housing;
an extendable and retractable thrust assembly surrounding said lead screw portion and having a proximal end located within said housing and a distal end extending outwardly from the distal end of said housing;
a manual override rotation member connected with said rotation shaft for rotation therewith, said rotation shaft and said override rotation member being axially fixed relative to said housing; and
an access opening in said housing to provide manual rotation access to said rotation member.

23. The actuator of claim 22 including a selectively openable and closeable cover for said access opening.

24. The actuator of claim 22 wherein said rotation member includes an override gear having a plurality of peripheral teeth.

25. The actuator of claim 24 including a selectively openable and closeable cover for said access opening.

26. An electrically powered actuator comprising:
a screw actuator having an inline, direct drive electrical motor with a drive shaft having first and second ends;
a rotation shaft connected with the first end of said drive shaft and being driven by said motor;
a rotary encoder connected with the second set of said drive shaft and being axially moveable relative to said rotation shaft;
an extendable and retractable thrust assembly having first and second ends;
a housing surrounding said thrust assembly; and
an impact relief assembly positoned between said rotation shaft and said thrust assembly and including a bumper of compressible material and bearing means positioned between said rotation shaft and said thrust assembly.

27. An electrically powered actuator comprising:
a screw actuator having an inline, direct drive electrical motor with a drive shaft having first and second ends;
a rotation shaft connected with the first end of said drive shaft and being driven by said motor;
a rotary encoder connected with the second end of said drive shaft and being axially moveable relative to said rotation shaft;
an extendable and retractable thrust assembly having first and second ends;
a housing surrounding said thrust assembly; and
an impact relief assembly positioned between said rotation shaft and said thrust assembly wherein said rotation shaft includes a distal end, and said thrust assembly includes a thrust tube having a distal end and wherein said impact relief assembly is positioned between said distal end of said rotation shaft and said distal end of said thrust tube and includes a bumper of compressible material and a bearing member positioned between said bumper and said distal end of said rotation shaft.

28. A welding apparatus comprising:
an electric actuator having an elongated housing with a longitudinal axis;
a rotation shaft being rotationally supported with the housing;
a thrust member having a proximal end and a distal free end and being axially moveable relative to said rotation shaft along said longitudinal axis, and an electric motor for rotating said rotation shaft;
a welding gun attached to said distal end of said thrust member;
an actuation link between said distal end and said welding gun; and
first and second axially spaced bearing members positioned between portions of said thrust member and corresponding portions of said housing.

29. The welding apparatus of claim 28 wherein said welding gun includes at least one welding tip positioned offset from said longitudinal axis.

30. An electrically powered actuator comprising:
an elongated housing having a longitudinal axis;
a rotation shaft extending along said longitudinal axis and being rotatably supported within said housing member;
a thrust member concentric with, and axially moveable relative to, said rotation shaft along said longitudinal axis;
a coupling nut connected with said thrust member and moveable therewith, said thrust member and said coupling nut being non-rotatable relative to said housing member;
an electric motor for driving said rotation shaft; and
a first bearing between said coupling nut and a first portion of said housing and a second bearing between said thrust member and a second portion of said housing.

31. An electrically powered actuator comprising:
a screw actuator having an electrical motor for driving a drive shaft having first and second ends;
a rotation shaft connected with the first end of said drive shaft;
a rotary encoder connected with the second set of said drive shaft;
an extendable and retractable thrust assembly having first and second ends; and
an impact relief assembly comprising a bumper of compressible material and a bearing means positioned between said rotation shaft and said thrust assembly.

* * * * *